(12) United States Patent
Stillman et al.

(10) Patent No.: US 6,696,900 B2
(45) Date of Patent: Feb. 24, 2004

(54) METHOD FOR DEMODULATING PSK MODULATED SIGNALS

(75) Inventors: Russell A. Stillman, Phoenix, AZ (US); Charles A. Waterbury, Phoenix, AZ (US)

(73) Assignee: Finepoint Innovations, Inc., Phoenix, AZ (US)

( * ) Notice: Subject to any disclaimer, the term of this patent is extended or adjusted under 35 U.S.C. 154(b) by 0 days.

(21) Appl. No.: 09/961,559

(22) Filed: Sep. 24, 2001

(65) Prior Publication Data

US 2003/0058036 A1 Mar. 27, 2003

(51) Int. Cl.[7] ............................. H03C 3/00; H04L 27/20
(52) U.S. Cl. ....................................... 332/103; 323/104
(58) Field of Search ............................... 332/103, 104; 375/308

(56) References Cited

U.S. PATENT DOCUMENTS

| | | | |
|---|---|---|---|
| 4,651,108 A | 3/1987 | Okita et al. ............... 329/110 |
| 4,757,272 A | * 7/1988 | Okada et al. .............. 329/308 |
| 5,097,220 A | 3/1992 | Shimakata et al. ......... 329/306 |
| 5,128,625 A | * 7/1992 | Yatsuzuka et al. .......... 327/156 |
| 5,198,623 A | 3/1993 | Landmeier .................. 178/19 |
| 5,202,643 A | 4/1993 | Sato ........................... 329/309 |
| 5,241,567 A | 8/1993 | Shimakata ................... 375/82 |
| 5,268,647 A | 12/1993 | Ichiyoshi .................... 329/308 |
| 5,436,598 A | 7/1995 | Harris ......................... 331/11 |
| 5,574,399 A | 11/1996 | Oura et al. ................. 329/306 |
| 5,610,949 A | * 3/1997 | Petranovich ................ 329/304 |
| 6,018,556 A | * 1/2000 | Janesch et al. ............. 375/326 |
| 6,130,577 A | * 10/2000 | Tamba et al. ............... 329/304 |
| 6,255,912 B1 | * 7/2001 | Laub et al. .................. 331/25 |

\* cited by examiner

Primary Examiner—Terry D. Cunningham
Assistant Examiner—Quan Tra
(74) Attorney, Agent, or Firm—Cahill, Sutton & Thomas P.L.C.

(57) ABSTRACT

The present invention is a method for demodulating a PSK modulated signal wherein the PSK system incorporates a transmitter generating a PSK modulated signal and wherein the transmitter is crystal based. A crystal based receiver receives the PSK modulated signal and the delta phase between the recovered PSK signal and a receiver generated reference signal is measured; the measurement is repeated with a predetermined phase shift. Voltage values are derived representing the results of each of the measurements and are applied to an analog-to-digital converter to derive digital values representing the two phases measured, and a corresponding delta phase. The digital values are applied to a look up table to derive a phase correction for the reference signal, and several methods are described to perform various types of PSK demodulation.

20 Claims, 18 Drawing Sheets

METHOD FOR DEMODULATING PSK MODULATED SIGNALS

FIELD OF THE INVENTION

This invention relates to the field of communications for transmitting symbols and more specifically to the demodulation of signals utilizing phase shift keying. These include: Standard Phase Shift Keying (PSK) also referred to as Binary PSK (BPSK), Differential PSK (DPSK), Quadrature PSK (QPSK), or other M-ary PSK methods, but will be referred to generally as PSK herein.

BACKGROUND OF THE INVENTION

The demodulation of PSK signals typically requires complex analog circuitry, and/or the use of a high-end processor such as a digital signal processor (DSP) with high speed analog to digital converters, or by providing a separate 'clock' channel to aid in the demodulation of the PSK data. The current state of the art demonstrates the complexity of current solutions to this problem. These solutions are lacking, in that they have one or more of the following negative aspects: high cost, high power requirements, high clock frequencies that generate excessive EMI, significant printed circuit board real estate, require implementation in a custom integrated circuit or some form of programmable logic due to complexity, are sensitive due to the use of a significant number of analog components, or require two complete transmit and receive channels. For applications sensitive to these issues, none of these solutions are acceptable.

Solutions to the problem of PSK demodulation in the prior art have a common inferred assumption, which can be stated as follows: The carrier signal used in the transmitter, and the reference signal generated in the receiver that is used in the demodulation process, can deviate widely from each other in terms of frequency. Therefore the demodulator must incorporate a means to characterize, and a method of compensation to aid in the correction of this wide deviation in frequency. In fact, there exists a large subset of systems in which this frequency disparity is actually very narrow. Prior art goes to great lengths to compensate for this frequency deviation by implementing phase locked loop (PLL) circuitry or through the use of high power DSP chips or complex digital logic. Instead of providing a solution for the most general case of PSK demodulation, this invention solves the PSK demodulation problem of the more typical case, which allows a significant reduction of the design requirements of the system, when coupled with the appropriate methods. By taking into account the existing functionality available in a typical PSK transmitter/receiver design, the system, when taken as a whole, can be greatly simplified.

Many PSK data systems contain crystal oscillators in both the transmitter and the receiver and typically contain an inexpensive microcontroller with embedded peripherals in the receiver, if not both the transmitter and the receiver (For example a pen transmitter and a tablet receiver in a digitizer system wherein pen position on a tablet surface is detected and the position coordinates are digitized). The existence of the crystal oscillators in both the transmitter and receiver, and the presence of an inexpensive microcontroller in the receiver can be exploited to reduce the complexity and cost of the system with a minimum of external hardware requirements. By requiring the transmitter and receiver to use crystal-controlled clocks, a complete PSK demodulator can be formed using the existing low cost microcontroller in the receiver when coupled with the methods of the invention and the integrated peripherals contained in the microcontroller. This results in an extremely low cost and low power solution utilizing a minimum of components. Thus, this invention applies to the demodulation of PSK signals, of various types, in systems that have a carrier frequency in the transmitter that is derived from a crystal controlled clock, and a receiver, which performs the PSK demodulation, that contains a microcontroller or other means to execute a method, which is clocked by a signal derived from a crystal controlled clock.

The following is a brief description of various implementations of prior art.

Analog PLL Demodulator

There are numerous patents relating to PSK data recovery using a phase locked loop (PLL). This has been a standard method for detection of PSK modulated signals and has been used for decades. Most of the patents in this area address various problems with PLL designs (i.e., false locking, expanding capture range, reducing capture time, etc). After reviewing numerous patents in this area, it can be inferred that a PLL solution is overly complex, and fraught with problems due to its highly analog nature. For this reason, the use of an analog PLL in this invention has been avoided.

Digital Signal Processing

These solutions fall into two categories; discrete digital circuitry, which would typically be implemented using a custom integrated circuit or programmable logic chip due to their complexity, and the more general DSP chip solution. The majority of the digital implementations utilize a quadrature mixer fed by a sine and cosine generator, or a quadrature-sampling configuration to recover the PSK modulated signal. They also require high-speed analog to digital converters, which provide A-to-D samples at a multiple of the transmitter carrier frequency, and are placed at various points in the design. These solutions all prove to be inadequate for one or more of the following reasons: excessive cost, power, clock rates or real estate requirements. This invention requires minimal external circuitry, utilizes a low cost low power microcontroller that is typically already part of the system, using low bandwidth A-to-D conversions with samples taken at the much lower symbol rate, and does not require a large gate count custom IC. Systems that include a DSP chip in place of a microcontroller can also be used to implement this invention at a much lower cost than the DSP solution in the prior art.

Second 'Clock' Channel

A third solution is that of adding an additional channel to the system to provide a synchronized clock signal. This greatly simplifies the PSK demodulation step, but ads complexity to the system by requiring another transmit and receive chain and associated hardware. Implementing this second channel in wireless systems has many drawbacks, as anyone working in the field is well aware. This invention requires only a single channel for proper operation.

Differential PSK

Several other implementations of prior art reduce the complexity of the demodulator by requiring the use of Differential PSK (DPSK). When using DPSK, the phase of the current symbol is measured and compared to the phase of the previous symbol. This simplifies the demodulation task somewhat, but eliminates the possibility of working with other PSK methods. This invention does not require the use of DPSK for its proper operation, but is compatible with DPSK as well as other PSK modulation techniques.

SUMMARY OF THE INVENTION

Briefly, the present invention is a method for demodulating a PSK modulated signal wherein the PSK system incorporates a transmitter generating a PSK modulated signal and wherein the transmitter is crystal based. A crystal based receiver receives the PSK modulated signal and the delta phase between the recovered PSK signal and a receiver generated reference signal is measured; the measurement is repeated after a predetermined phase delay. Voltage values are derived representing the results of each of the measurements and are used to adjust the phase of the reference signal.

DETAILED DESCRIPTION OF THE PREFERRED EMBODIMENT

Figure 1:
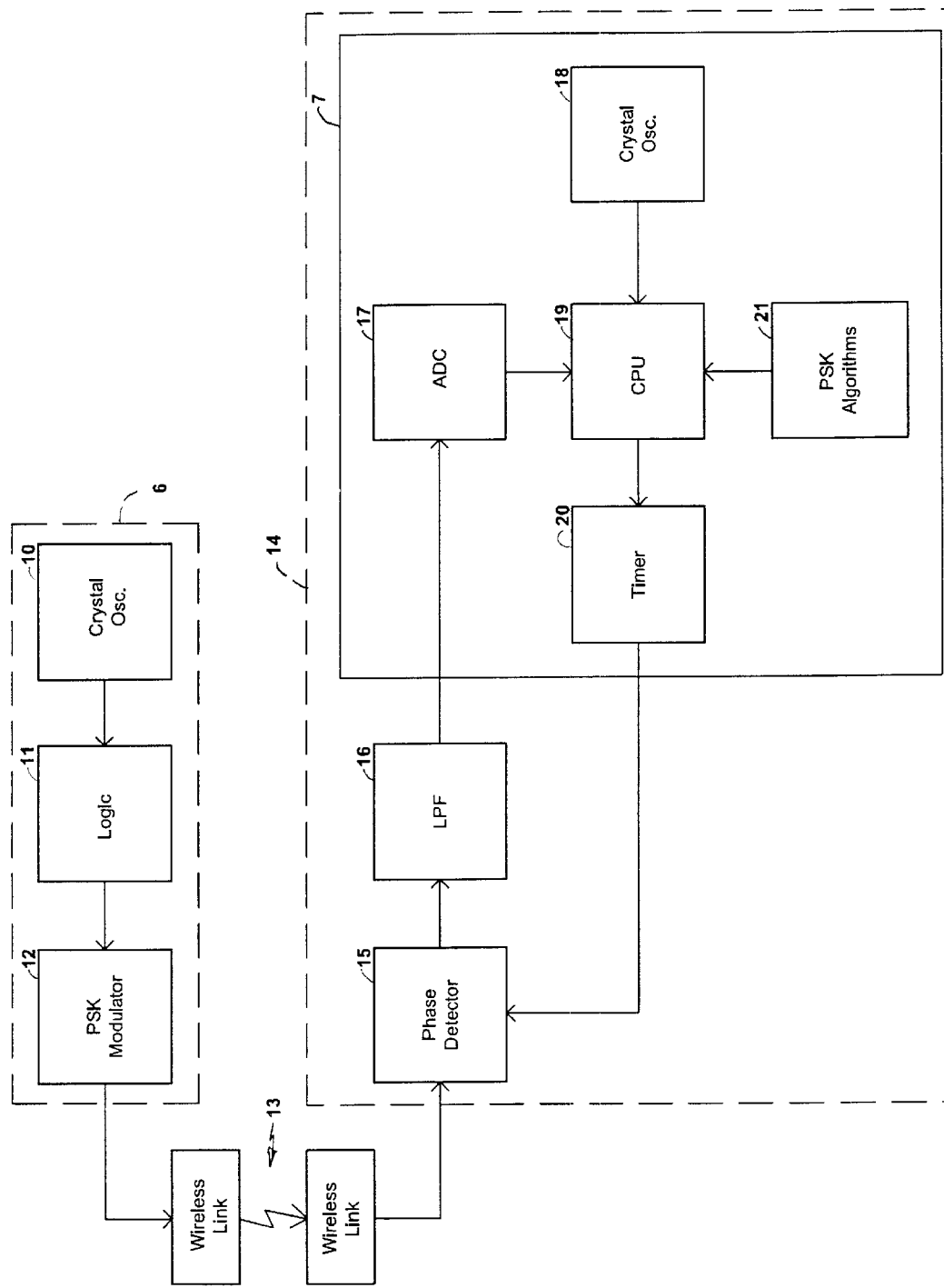
FIG. 1. Block diagram of a PSK modulator and demodulator system for implementing the method of the present invention.
Figure 2:
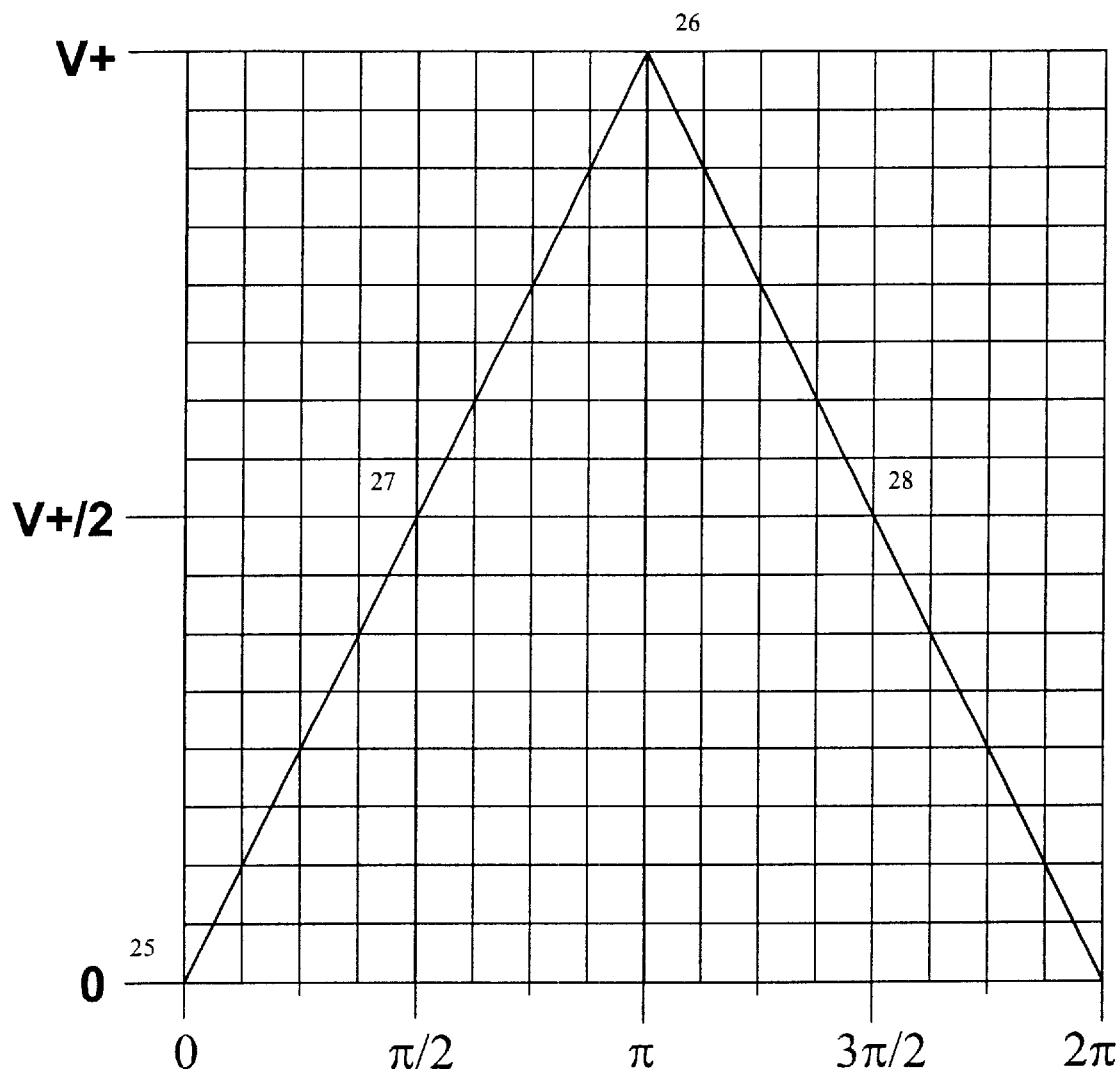
FIG. 2. Plot of a filtered phase detector output voltage vs. delta phase.

The block diagram of FIG. 1 shows a PSK transmitter 6 and receiver 14 with a wireless transmission path 13 therebetween. The transmitter sends a PSK modulated signal that is derived from a crystal oscillator 10. The logic block 11 and PSK modulator 12 in the transmitter perform the PSK modulation at the desired symbol rate. The receiver 14 receives the PSK signal from the transmitter 6, while the microcontroller 7 in the receiver provides key functions for the demodulation. These are: the timer 20 that generates a reference signal for the phase detector 15 that measures the phase difference or delta phase between the recovered PSK signal and the reference signal, the analog-to-digital converter (ADC) 17, the crystal oscillator 18 which clocks the timer, and a means to implement the PSK algorithms 21 through the execution of program instructions by the CPU 19. These instructions will normally be stored in the form of firmware. Microcontrollers having imbedded peripherals to provide the above functions for demodulation are readily available. For example, it has been found that the microcontroller identified as PIC 16C74 from the Microchip Corporation provides the necessary functions to practice the method of the present invention. Some microcontrollers lacking the provision of a particular imbedded peripheral or functional capability may be used by supplying the necessary additional circuitry externally (to be described hereinafter). By utilizing the integrated timer peripheral of the microcontroller 20, a programmable reference signal is generated which can be controlled by setting the high and low timing, and is derived from the microcontroller crystal oscillator 18 to provide a stable output. This reference signal is provided as an input, along with the recovered PSK signal to the phase detector 15. The phase detector compares the phase of the recovered PSK signal to the phase of the reference signal and provides an output signal which has a pulse width that is proportional to the phase difference between the two inputs. By filtering the output of the phase detector, an averaged DC voltage level is obtained. This is accomplished with the low pass filter 16. When the PSK signal and the reference signal are exactly in phase, the output of the low pass filter will be at its lowest DC level of zero. See point 25 in FIG. 2.

Figure 3:
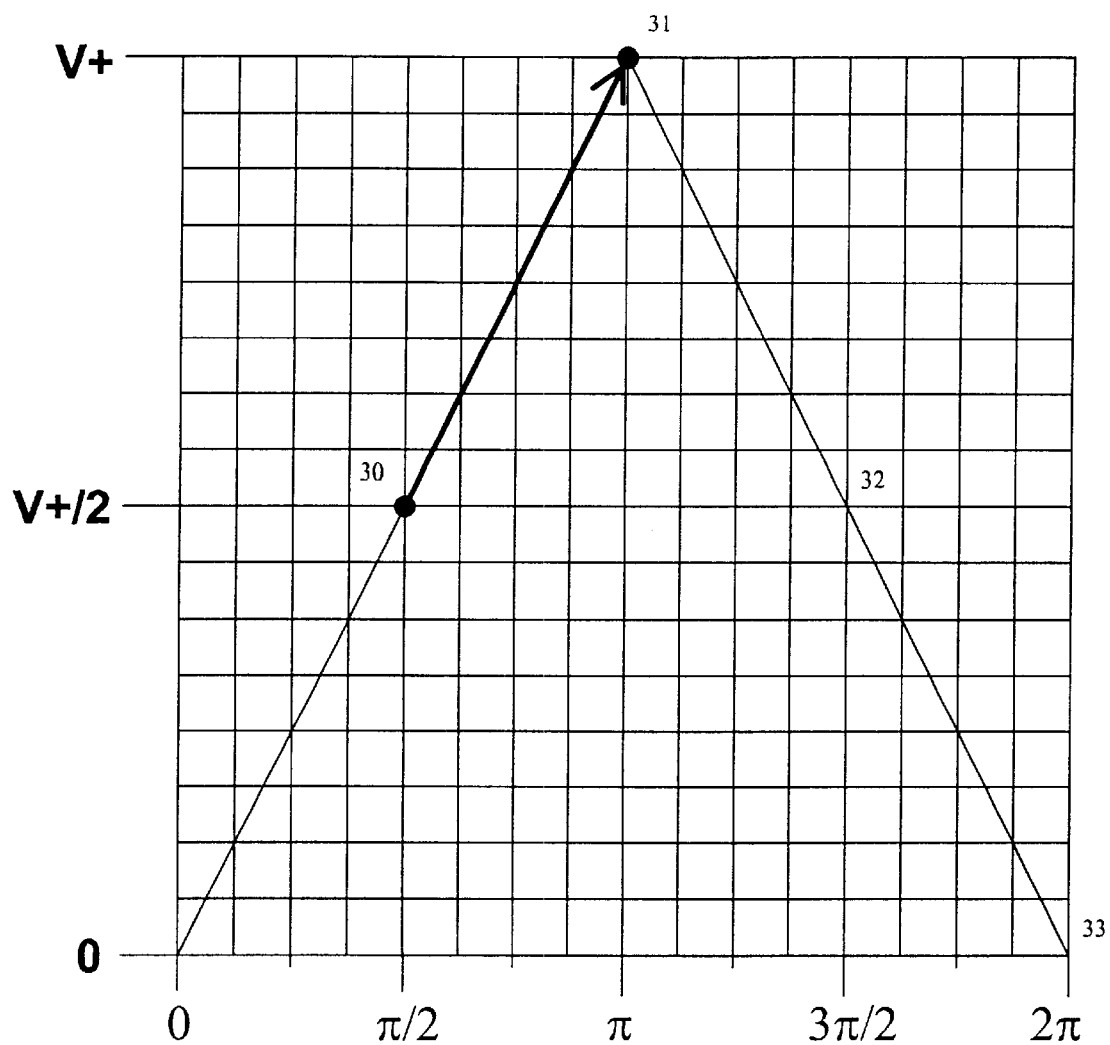
FIG. 3. Plot of a phase detector output voltage vs. delta phase showing an example of phase measurement to eliminate measurement ambiguity.

When the PSK signal and the reference signal are exactly $\pi$ radians out of phase, the output of the low pass filter will be at its highest DC level of V+. See point 26 in FIG. 2. The value of the upper DC voltage level will be equal to the voltage level which is defined for a logic value of '1' in the system. By performing an analog to digital conversion of the output of the low pass filter 16, using the integrated ADC peripheral 17 in the microcontroller, the phase difference between the recovered PSK signal and the reference signal can have a numerical value assigned to it. It should be noted that there is some ambiguity of the output voltage from the low pass filter and the actual phase difference between the recovered PSK signal and the reference signal. Looking at the graph in FIG. 2, which shows the relationship between the delta phase (the phase difference between the recovered PSK signal and the reference signal), and the output voltage of the low pass filter, it can be seen that for every output voltage value (Y axis), there are two possible delta phase angles (X-axis). For example the voltage values for a delta phase of $\pi/2$ radians (point 27) and $3\pi/2$ radians (point 28), both result in an output voltage of V+/2. The method of the present invention processed by the microcontroller eliminates this ambiguity by measuring the phase difference between the recovered PSK signal and the reference signal two times, with a $\pi/2$ radian or other convenient offset of the phase of the reference signal made between the first and second measurements. This eliminates any uncertainty, and pinpoints the point on the curve of FIG. 2, which represents the current phase difference between the recovered PSK signal and the reference signal. As an example, assume that the transmitter PSK carrier frequency and the receiver reference frequency are at some random phase relationship as shown at 30 in FIG. 3. This will result in an initial measurement of V+/2 volts. As stated earlier, this value could be a result of a delta phase of $\pi/2$ radians (point 30) or $3\pi/2$ radians (point 32). If, however, another measurement is taken, say with a $\pi/2$ radian offset (point 31) relative to the initial measurement 30, then it can be determined that the initial point is indeed 30 and not 32. If the initial measurement of V+/2 was the result of a phase offset of $3\pi/2$ radians (point 32), then the second measurement with a phase offset of $\pi/2$ radians would result in a measurement value of zero volts (point 33). Thus, the present technique may be used to confirm the phase relationship between the PSK signal and the reference signal.

Figure 4:
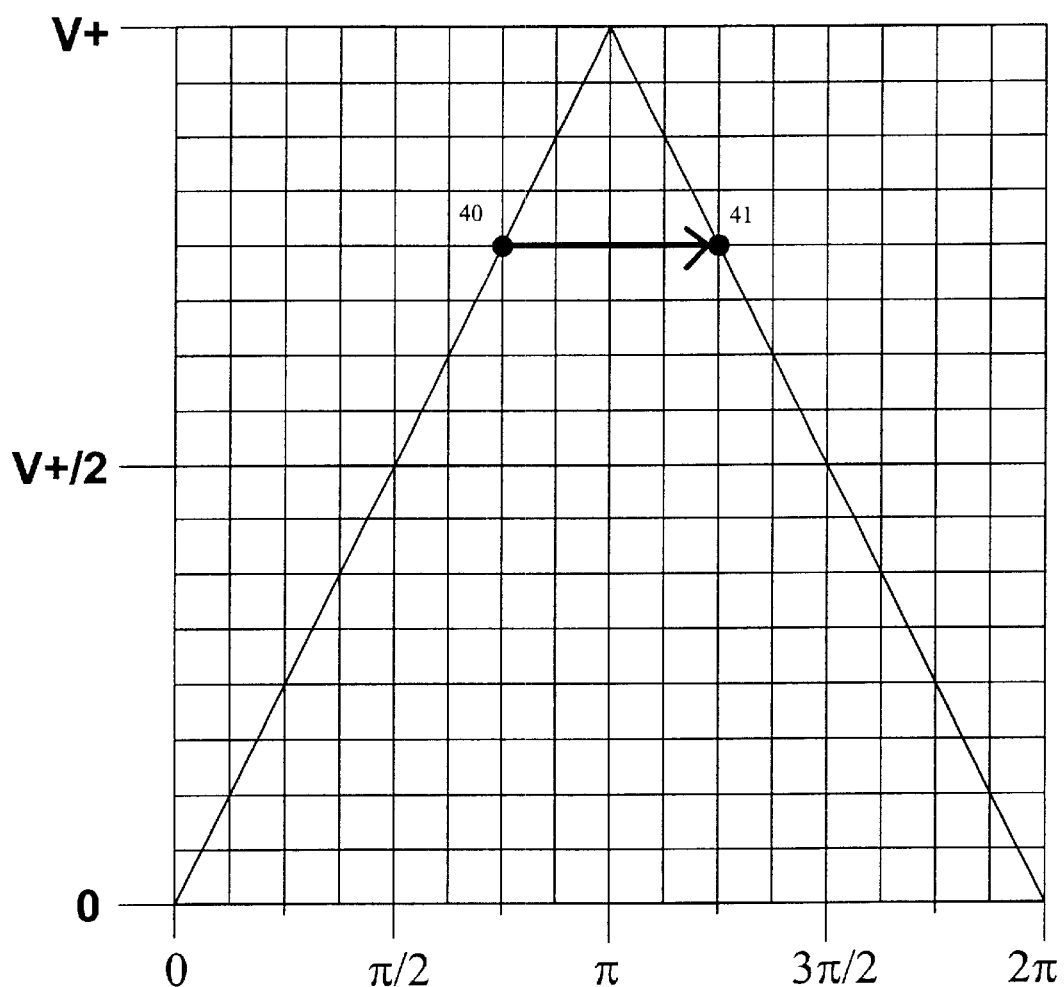
FIG. 4. Plot of a phase detector output voltage vs. delta phase showing an example of phase measurement special case.
Figure 5:
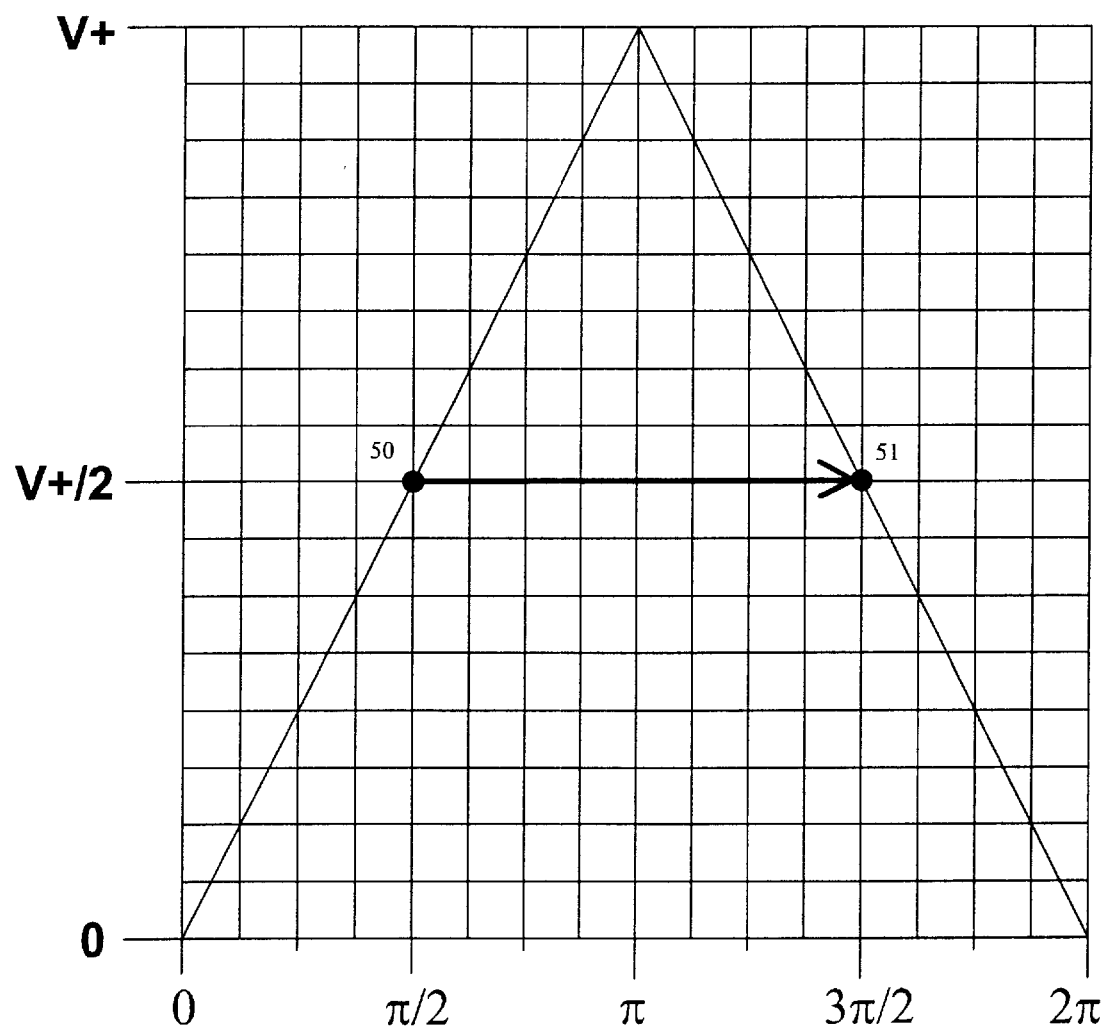
FIG. 5. Plot of a phase detector output voltage vs. delta phase showing an example of non-optimum relative phase setting for demodulation of PSK symbols.
Figure 6:
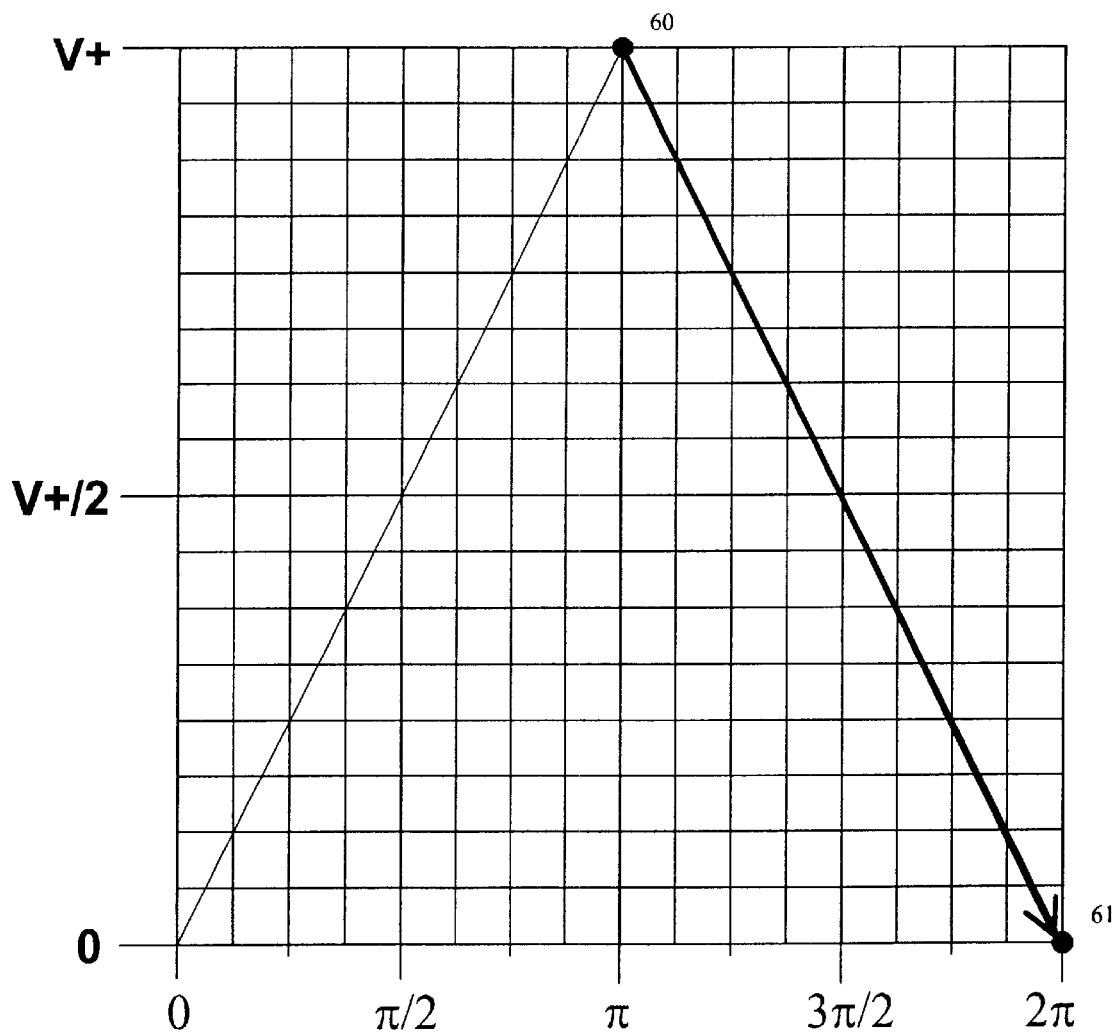
FIG. 6. Plot of a phase detector output voltage vs. delta phase showing an example of optimum relative phase setting for demodulation of PSK symbols.

A unique case exists, where both the first and second measurements result in the same value. This is shown in FIG. 4. The first point 40 and the second point 41 with a $\pi/2$ radian phase offset both result in a measurement value of 0.75V+. This however causes no ambiguity since there are no other possible phase angle pairs that produce equal output voltage values. Using and a decision tree or lookup table, the method will set the phase of the reference signal to optimize the recovery of the PSK data by the phase detector. This is accomplished by setting the reference phase such that the average DC voltage output from the low pass filter is near the extreme upper or lower values. Or, in other words, moving it away from the V+/2 level. FIG. 5 demonstrates the case where the relative phase difference between the recovered PSK signal and the reference signal results in a measurement value of V+/2 (point 50). When a PSK phase reversal of $\pi$ radians occurs (point 51), the measurement value does not change. The PSK phase reversal is therefore not detectable by the demodulator. In FIG. 6, however, the relative phase difference between the recovered PSK signal and the reference signal is at an optimum setting 60 and results in a full scale change in the measurement value from V+ at 60 to zero at 61. To avoid cases such as FIG. 5 and insure optimum measurement values as in FIG. 6, the reference signal phase is adjusted. The initial adjustment of the reference signal can be performed during the typical preamble period provided by the PSK transmission. This is a period of time in typical PSK systems where no symbols are sent, and during which time the output phase of the transmitter is constant. The preamble period provides a reference phase from the transmitter that will aid in the demodulation process. When using standard PSK modulation, a change in symbol value results in a change in phase of the PSK carrier of $\pi$ radians.

The following is an example of a look-up table to adjust the phase of the reference signal such that the output of the phase detector is at a positive or negative peak. Note that many different initial phase adjustments and normalizations can be used. However, this example demonstrates a relatively efficient use of look-up tables with only sixteen entries required, but with sufficient resolution to overcome typical system noise.

In this example, the absolute magnitude of the A-to-D value is used; that is, the magnitude of the A-to-D value is subtracted from the A-to-D mid-point reading, without regard to the absolute phase being positive or negative. However, since this reading is performed during the "known" phase of the preamble period, then the "absolute" phase can be easily recovered. Also for this example, each absolute value is further normalized to two bits by dividing (or shifting right) by the appropriate value. Therefore, the "normalized" value represents the A-to-D magnitude of each reading as being located in one of four quadrants: '0' if the normalized magnitude is less than one-quarter of the maximum, '1' if within one-quarter to just less than one-half magnitude, '2' if within one-half to just less than three-quarters magnitude, and '3' if within the upper three-quarter magnitude quadrant.

The resolution of the reference phase adjustment in this example is $\pi/8$ radians. A first A-to-D reading (AD1) is performed at the current reference phase, and normalized as discussed above. The reference phase is then incremented in this case by $\pi/4$ radians (Note: this is a different phase delay than described above—it could be any convenient phase delay). A second A-to-D reading (AD2) is performed at this new reference phase, and normalized as discussed above. (Note, the reference phase is "wrapped" if it is incremented past $15\pi/8$, such that $2\pi$ is set to a phase of '0', and $17\pi/8$ is adjusted to '$\pi/8$'). The AD1 reading is used as the lowest two bits of the table offset (bit 0 & 1), while the AD2 reading is used as the next two bits of the table offset (bits 2 & 3). Therefore, when the table is displayed as a four-by-four matrix as displayed below, then each row is entered depending on the "quadrant" magnitude of the AD1 reading (top to bottom row being quadrant 0 to 3, respectively), while each column is entered depending on the "quadrant" magnitude of the AD2 reading (left to right being quadrant 0 to 3, respectively). The value in the table is the phase value to be added to (or subtracted from if negative) the phase that is currently selected (that used to take the AD2 reading). When this is completed, then the "final" phase is adjusted such that the absolute magnitude of the A-to-D reading will be within the highest quadrant. That is, within 75% of the positive or negative peak.

Those skilled in the art can also see that a further reduction of this lookup table could be performed since rows 0 and 1 are identical, and rows 2 and 3 are almost identical. However, it is shown in this manner to provide for an easy reference, with each A-to-D reading divided into quadrants.

|  |  | AD1 | | | |
| --- | --- | --- | --- | --- | --- |
|  |  | <.25 | .25–.50 | .50–.75 | >.75 |
| AD2 | <.25 | $+4\pi/8$, | $+3\pi/8$, | $+2\pi/8$, | $+\pi/8$ |
|  | .25–.50 | $+4\pi/8$, | $+3\pi/8$, | $+2\pi/8$, | $+\pi/8$ |
|  | .50–.75 | $-3\pi/8$, | $-2\pi/8$, | 0, | 0 |
|  | >.75 | $-3\pi/8$, | $-2\pi/8$, | $-\pi/8$, | 0 |

The demodulation method will convert the integer measurement values from the analog-to-digital converter, to their binary equivalent using the following rule: ADC measurement values above V+/2 are assigned to logic '1' while measurement values below V+/2 are assigned to logic '0'. In this way, once the relative phase of the reference signal is properly adjusted to provide an analog to digital converter measurement value near V+ as described above in connection with the look up table, any transitions from a value above V+/2 to a value below V+/2 will be interpreted as a PSK transition from a logic '1' state to a logic '0' state, and transitions from a value below V+/2 to a value above V+/2, will be interpreted to be a PSK transition from a logic '0' state to a logic '1' state. It should be noted that the state definitions above are arbitrary, and the role of the logic '0' and '1' states could easily be reversed.

Figure 7:
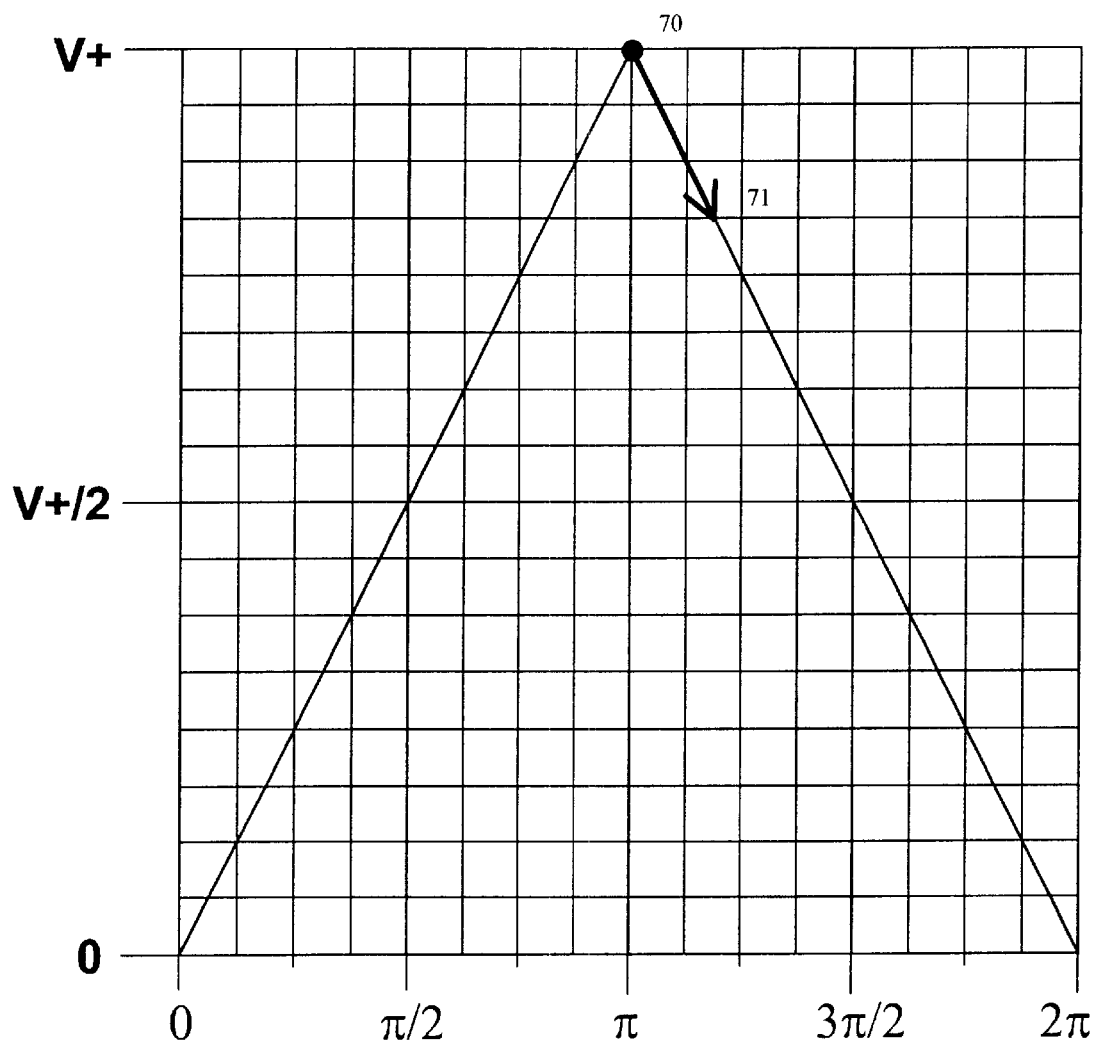
FIG. 7. Plot of a phase detector output voltage vs. delta phase showing an example of dynamic effect of moving relative phase.

The above description of this invention describes the case where the relative phase between the transmitter PSK carrier and the receiver demodulator reference signal are static, or not changing with time. This was done to simplify the explanation of the basic concept. In reality, this relative phase is dynamic or changes with time. Although this dynamic phase relationship exists and it's effects will be described below, it should be noted that by reducing measurement windows to short periods of time relative to the rate of change of phase, accurate estimates of values will be obtained. FIG. 7 shows an initial delta phase setting of π radians 70. As time passes, the relative phase between the recovered PSK signal and the reference signal begins to change and at a future time moves to 71. The rate of change or velocity of this movement is related directly to the difference in frequency between the crystal derived PSK carrier in the transmitter and the crystal derived reference signal, and can be calculated as follows:

$$2\pi[F\ carrier - F\ reference]\ \text{radians per second}$$

By assuming standard crystals in the modulator and demodulator with a tolerance of 50 parts per million, and that the worst case condition of frequency matching exists, with Fcarrier @+50 ppm and Freference @−50 ppm, the maximum rate of change of phase would be:

$$2\pi[(Fcarrier \times 1.00005) - (Freference \times 0.99995)] = 2\pi Fcarrier \times 0.0001\ \text{radians per second}$$

Where:

$$Fcarrier = Freference$$

Figure 8:
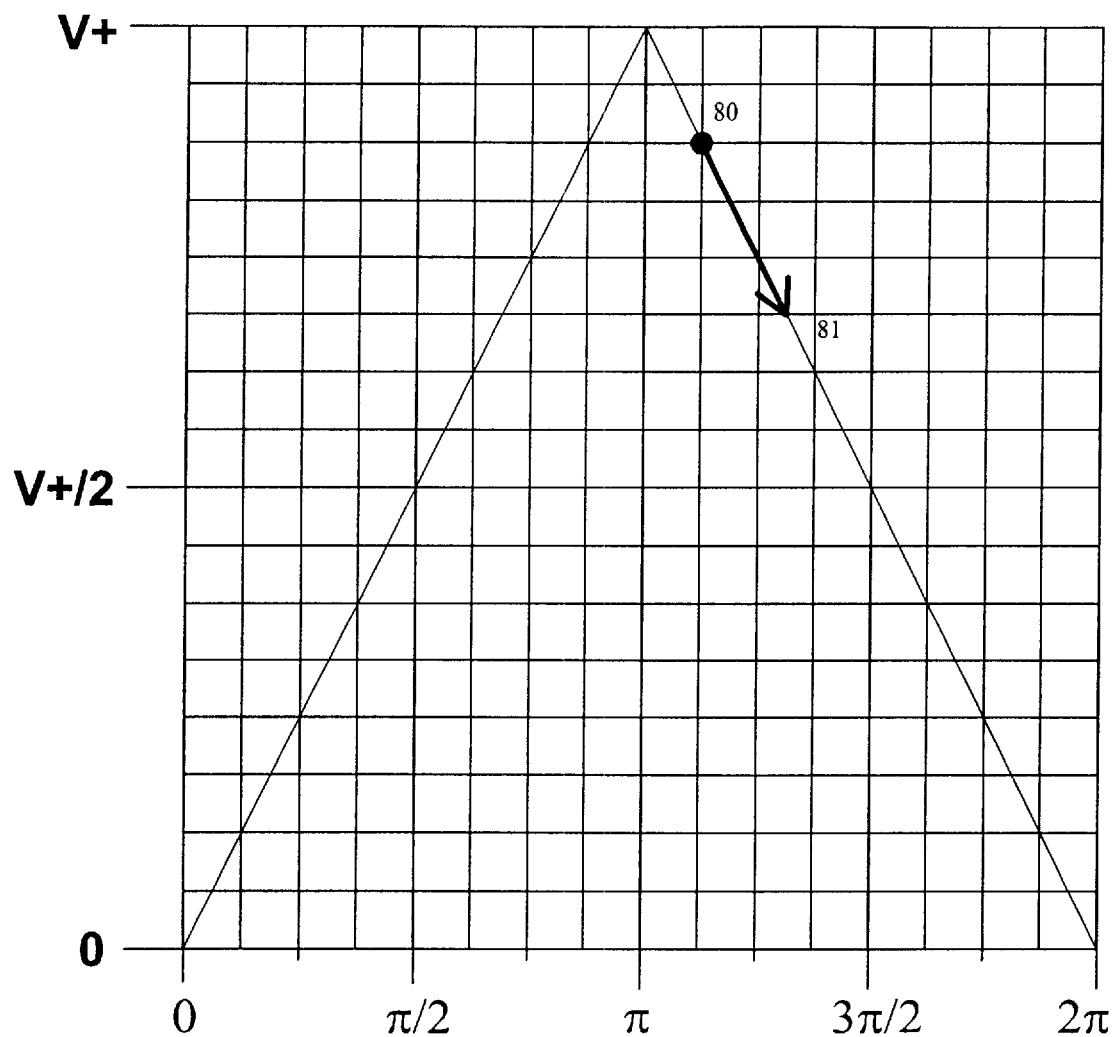
FIG. 8. Plot of a phase detector output voltage vs. delta phase showing an example of the dynamic effect of moving relative phase with a worst-case initial reference phase setting.
Figure 9:
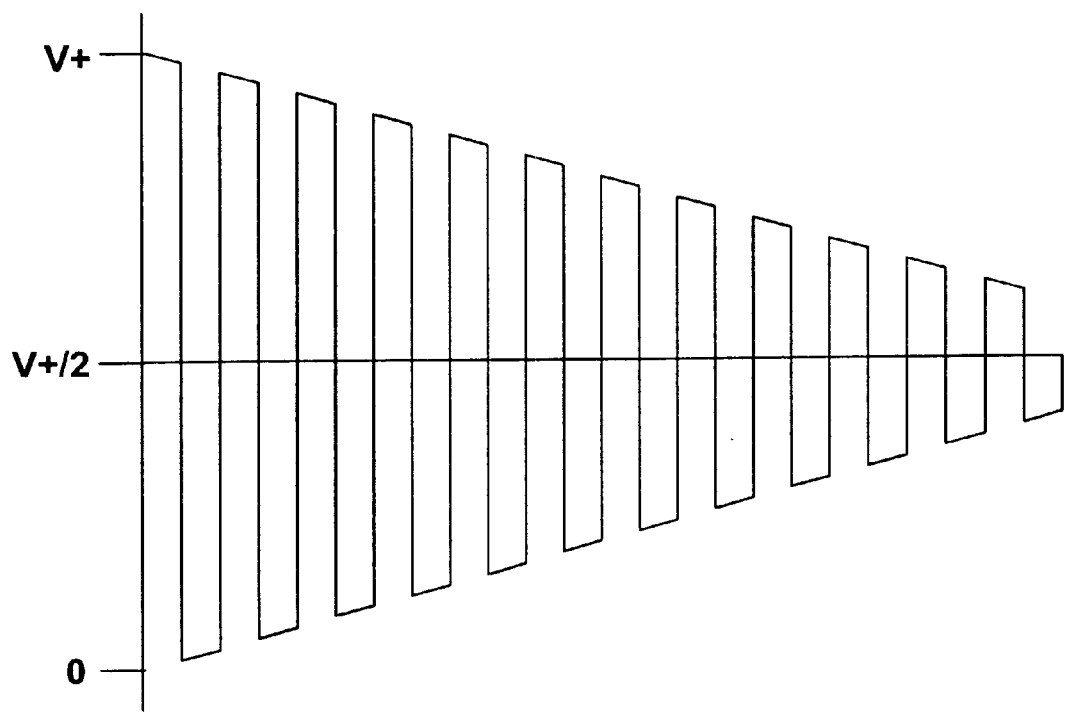
FIG. 9. Plot of a demodulated PSK alternating 1-0-1-0 symbols available at the input to the analog to digital converter with initial reference signal adjustment.
Figure 10:
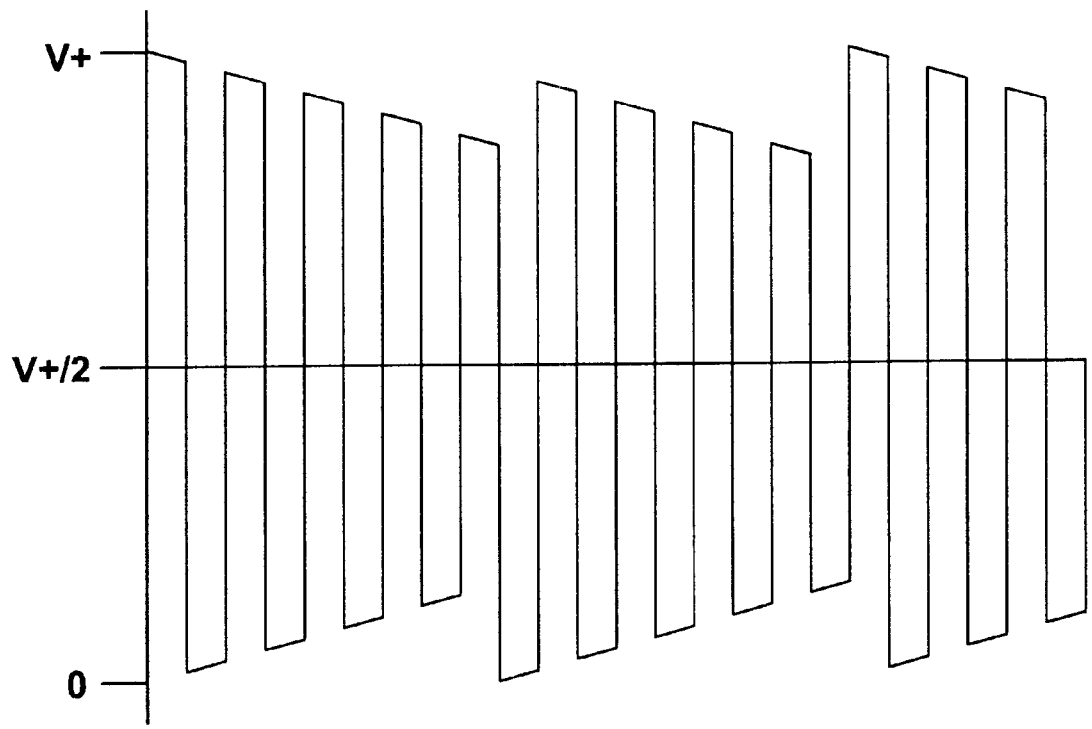
FIG. 10. Plot of demodulated PSK alternating 1-0-1-0 symbols available at the input to the analog-to-digital converter, with intermittent reference phase correction.
Figure 11:
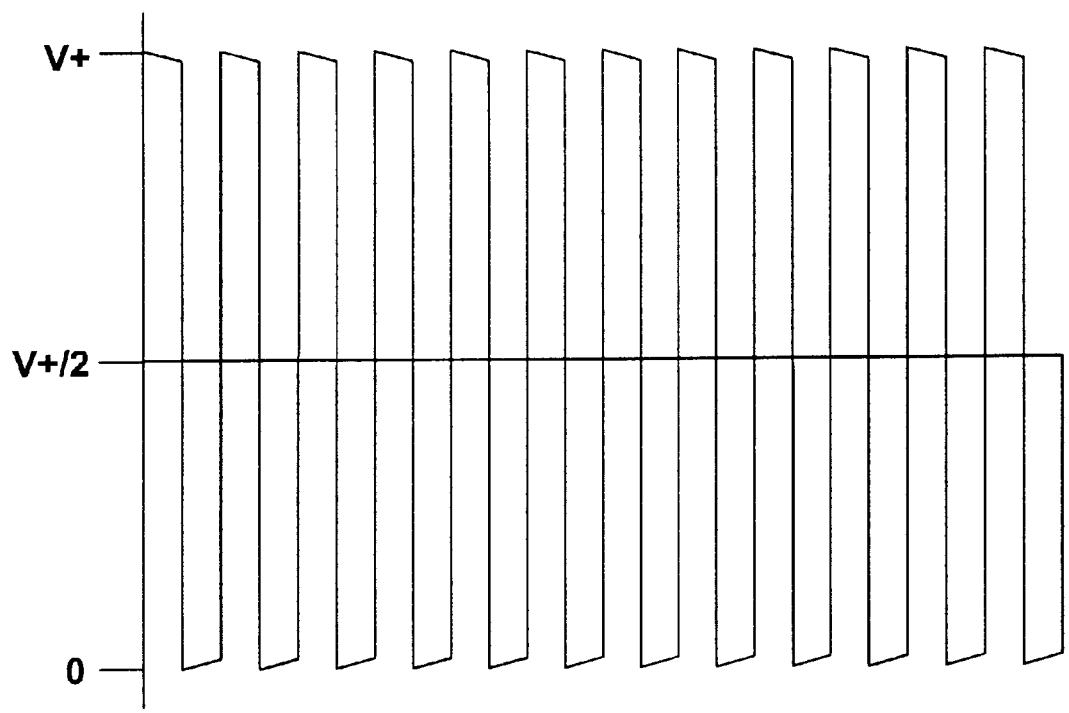
FIG. 11. Plot of demodulated PSK alternating 1-0-1-0 symbols available at the input to the analog-to-digital converter, with continuous reference phase correction.

An example will clarify the effect of this rate of change of relative phase. Assuming a PSK carrier frequency of 500 KHz and a reference frequency of 500 KHz, both derived from crystal oscillators with a tolerance of 50 ppm, the rate of change of relative phase between the PSK carrier and the reference signal would approximately 314 radians per second. Looking at FIG. 7, the movement of delta phase from 70 to 71 represents a change of 3π/16 or 0.589 radians. The time to move 0.589 radians at a rate of 314 radians per second would be 1.875 mS. Using these rate of change and time values, FIG. 8 shows a worst case initial reference point 80 and resultant worst case ending delta phase value 81 at the end of the 1.875 mS. It can be seen from FIG. 8 that at the end of the 1.875 mS the ADC value is sufficiently far from V+/2 to allow the detection of PSK phase reversals. If in this time period, the PSK symbol rate were 9600 symbols per second, a total of 18 symbols could be transmitted without requiring the adjustment of the phase of the reference signal. FIG. 9 shows the effect of the dynamic delta phase error on the recovered PSK symbols at the input to the analog to digital converter 17 using an alternating pattern of 1's and 0's at the symbol rate. As the PSK peaks above and below the V+/2 mark approach the V+/2 level, it becomes more difficult to detect the transition due to system noise and ADC resolution. Allowing the dynamic phase shift to continue without adjusting the reference signal will eventually cause the PSK data to be inverted. The method of the present invention permits algorithms in the demodulator to allow for a short burst of PSK data as described above, with no reference signal adjustment after the initial adjustment made during the preamble, or can be selected to intermittently (at predetermined intervals) or continuously adjust the reference signal phase for demodulating large strings of symbols. FIG. 10 shows the effect of the dynamic delta phase error on the recovered PSK symbols at the input to the analog to digital converter with intermittent adjustment of the reference signal. Algorithms in the demodulator can also characterize the rate of change of the relative phases of the PSK carrier and the reference signal, and calculate a phase correction value that will increase in accuracy as time passes. This allows the reference signal phase adjustments to be made continuously at the symbol rate for increased noise immunity. This is shown in FIG. 11.

Figure 12:
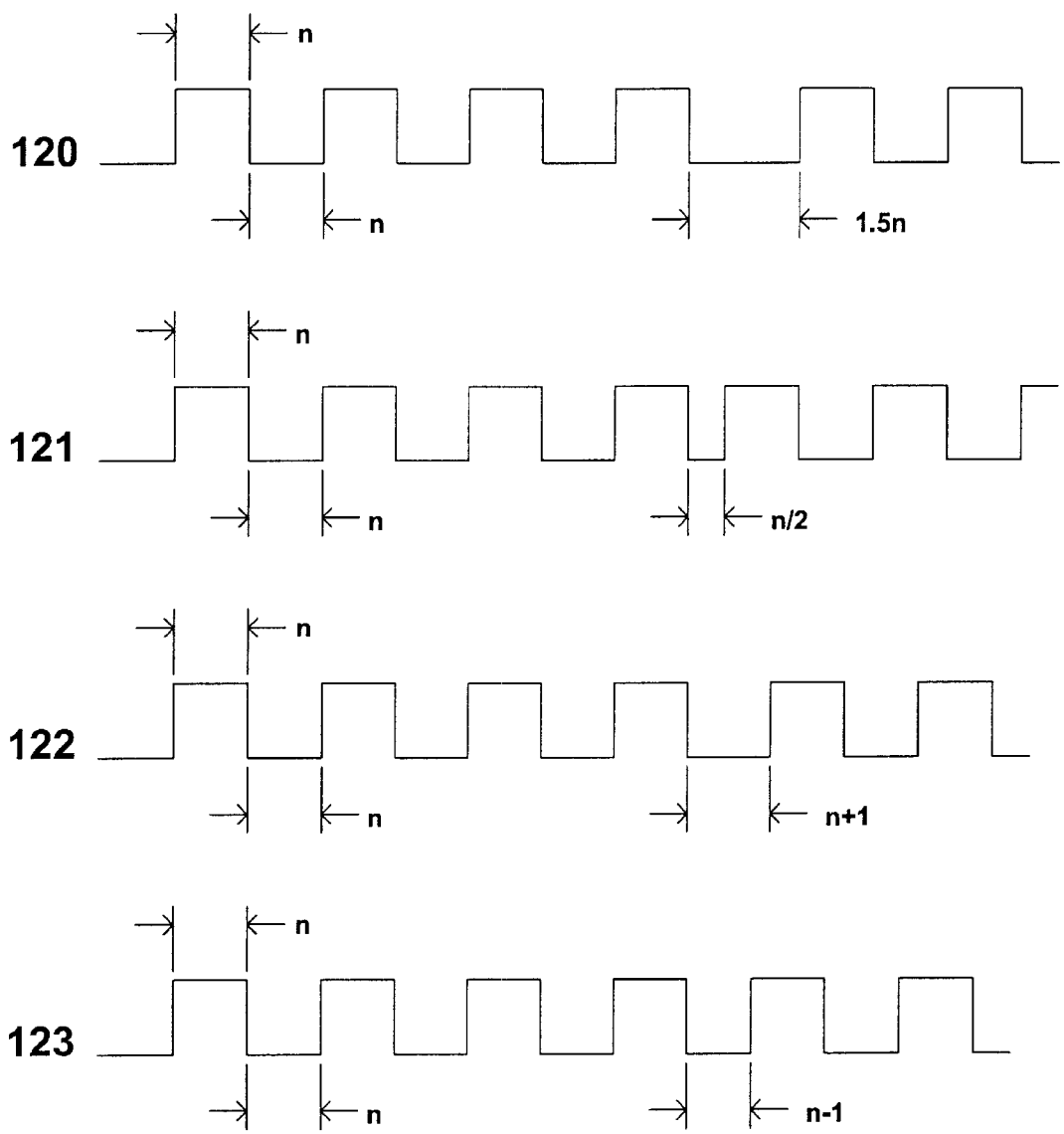
FIG. 12. Timing diagrams useful in the description of a method for adjusting the phase of the reference signal.
Figure 13:
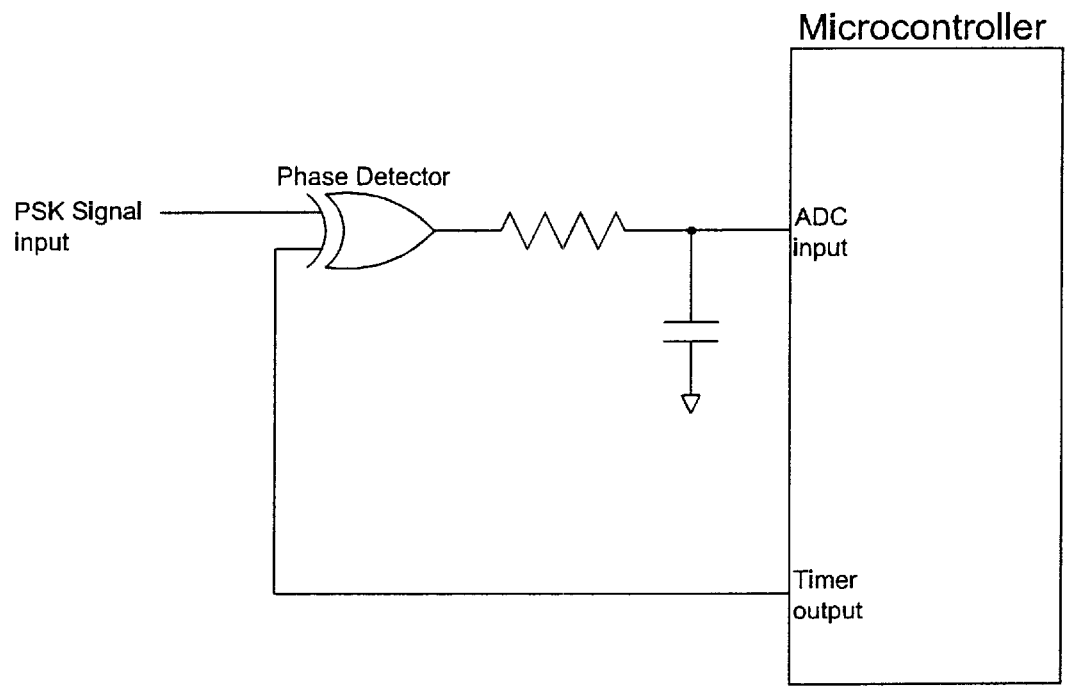
FIG. 13. A schematic circuit diagram of a simple implementation of apparatus for practicing the method of the present invention.
Figure 14:
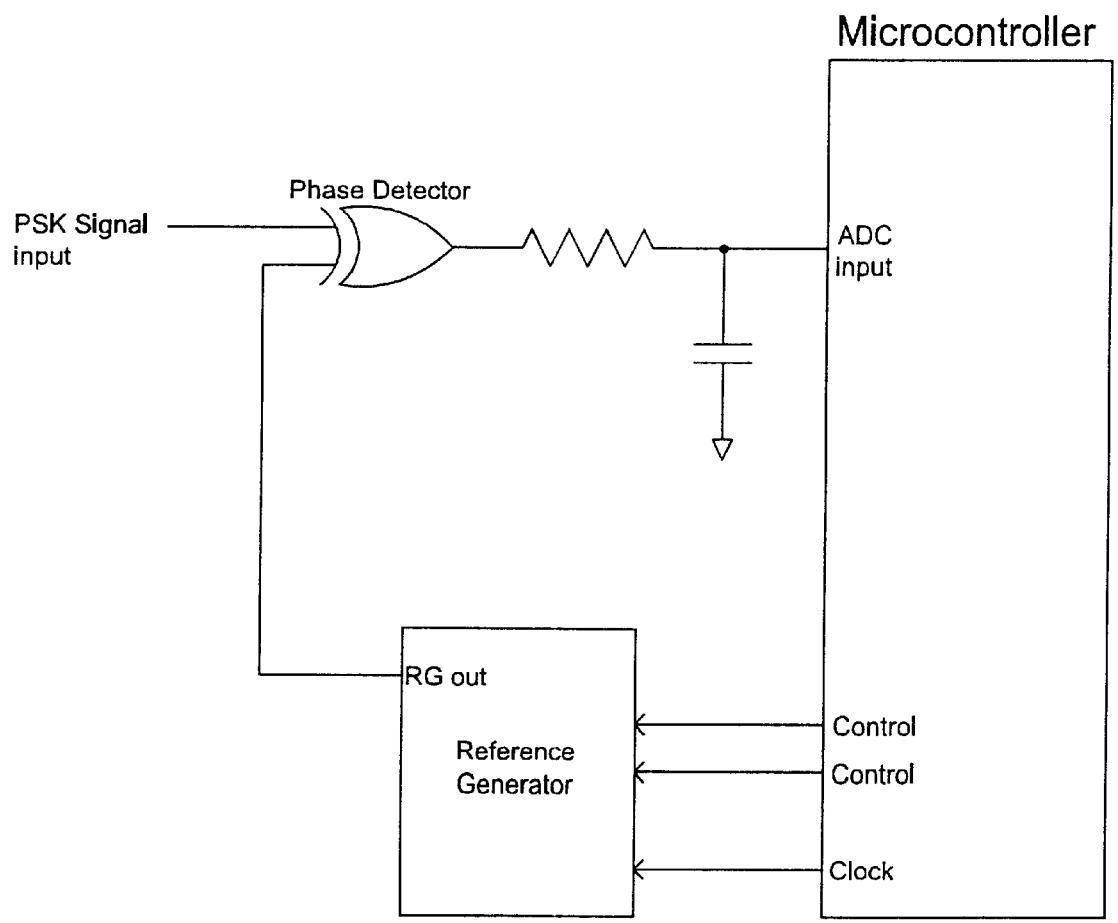
FIG. 14. A schematic circuit diagram showing another implementation of apparatus for practicing the method of the present invention.

FIG. 12 shows timing diagrams of a method for adjusting the phase of the reference signal. The timing diagrams show a reference signal that has a nominal period of 2 n counts of the crystal clock. The reference frequency is therefore Fcrystal/2 n. Timing diagram 120 shows an extended 'low' time of the reference signal (1.5 n) that will cause a π radian lag in the reference signal. Timing diagram 121 shows a reduced 'low' time of the reference signal (n/2) that will cause a π radian lead in the reference signal. Timing diagrams 120 or 121 can be used to initiate a phase change in the reference signal, to be used as the second measurement to allow the elimination of the ambiguity of the phase detector to determine the actual phase difference between the recovered PSK signal and the reference signal. Timing diagrams 122 and 123 show small integer corrections to the phase of the reference signal (n+1,n−1) that are used to continuously adjust the phase of the reference signal. The phase step resolution of the timer is limited by the crystal derived timer clock frequency, relative to the PSK carrier frequency. As an example, with a timer clock frequency of 8 MHz, and a PSK carrier frequency of 500 KHz, a resolution of π/8 radians is achieved. It may not be possible for the timer peripheral in the microcontroller to generate a reference signal with adequate resolution if the clock rate of the microcontroller is low. In this case, external circuitry could be added to the demodulator to generate the reference signal, which would be controlled by the execution of the same method in the microcontroller. FIG. 13 is a schematic drawing of external circuitry required to perform PSK demodulation in a PSK system with both modulator and demodulator clocks being derived by crystal controlled clocks, and a microcontroller or other hardware able to execute the required methods and containing the required embedded peripherals. FIG. 14 shows a secondary implementation, which provides an external reference signal generator.

It is important to note that the A-to-D conversions of the above description are performed at the symbol rate, in this case, 9600 symbols per second. The conversion rate of a typical prior art DSP implementation is based on the carrier frequency, in this case 500,000 cycles per second. It can be seen from this example, that the DSP solution requires an A-to-D conversion rate that is over 50 times as fast as the method used in this invention. Also, a number of delta phase measurements can be performed, and an average value of the delta phase is then calculated. This allows the system to measure the delta phase slippage with an accuracy that is related to the number of measurements that have been averaged. Using this average value, only a single A-to-D conversion is required, to determine the PSK symbol value. The second measurement that is used to determine the delta phase slip, is not needed and the processor overhead to execute the method of this invention is reduced.

Figure 15:
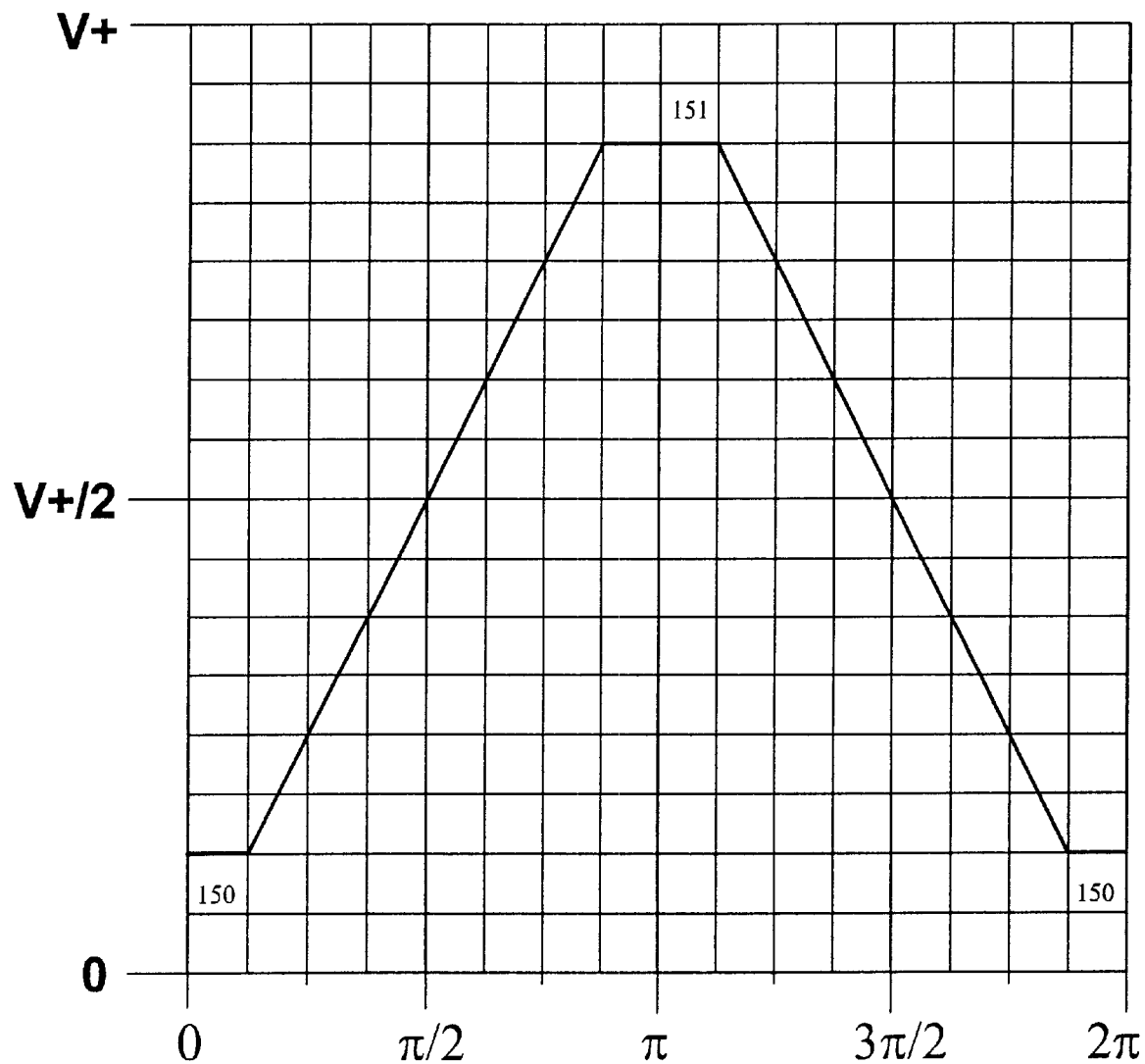
FIG. 15. Plot of filtered phase detector output voltage vs. delta phase in the case of non-symmetrical PSK logic level signal.
Figure 16:
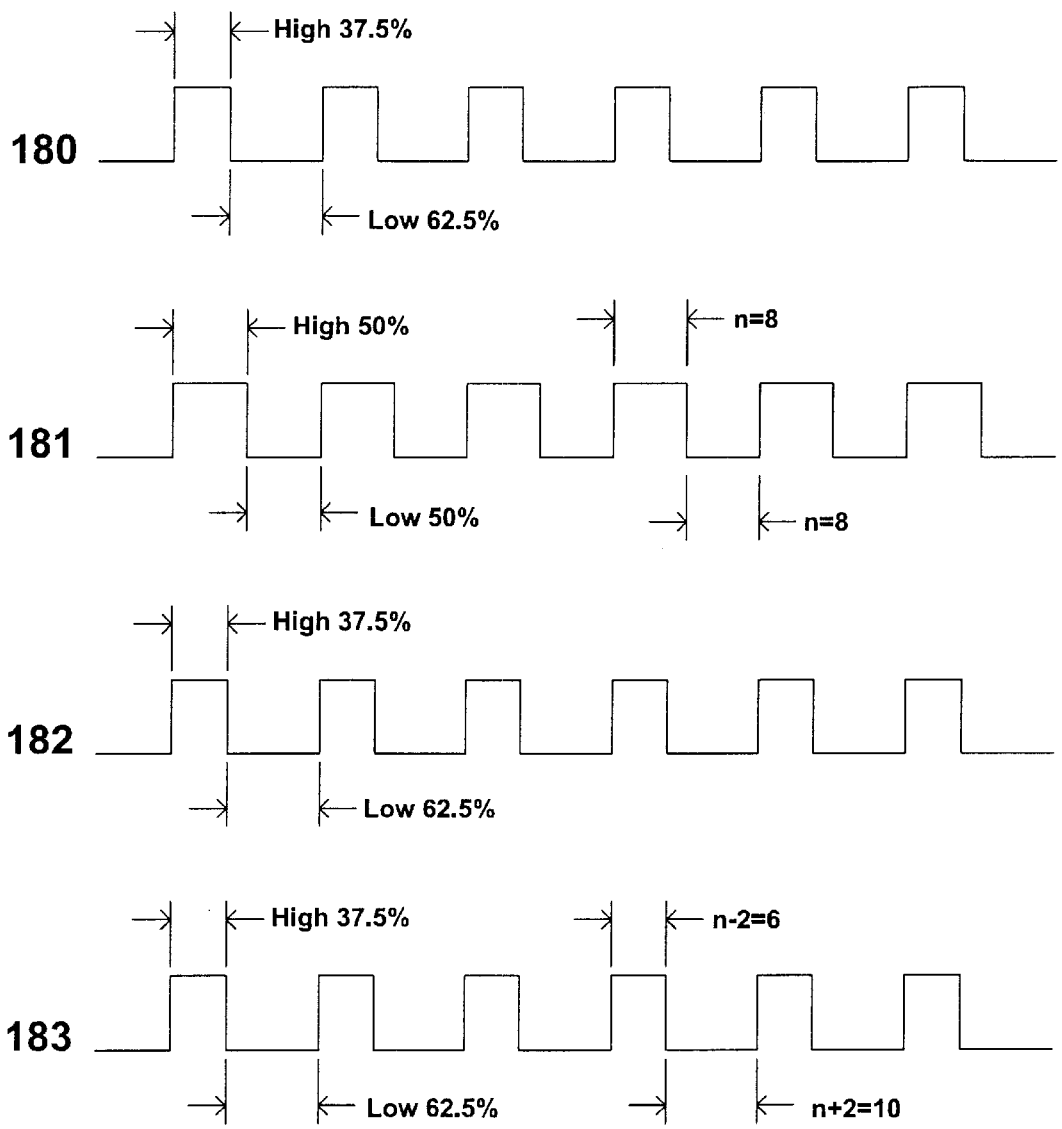
FIG. 16 Plot of several recovered PSK signals showing the effects of duty cycle variations.

The previous descriptions assume that the recovered logic level PSK signal provided as an input to the phase detector has a 50/50 duty cycle. Circuitry in the receiver that amplifies and limits or detects the signal from the wireless PSK transmission may behave asymmetrically, and may provide a recovered PSK signal to the phase detector with a duty cycle other than 50/50. This causes a distortion in the delta phase transfer curve as shown in FIG. 15. Note that at the top 151 and bottom 150 the triangular peaks are flattened when compared to FIG. 2. This is due to the fact that the recovered PSK signal and the reference signal do not have the same duty cycle. The points 150 on the left and 150 on the right are continuations of each other as the delta phase wraps forward from 2/π to 0 radians or backward from 0 to 2π radians. FIG. 16 shows the case of a recovered PSK signal 180 that has a 37.5/62.5 duty cycle signal. Signal 181 shows the default 50/50 duty cycle reference signal that would normally be used as the other input to the phase detector wherein a reference generator uses eight counts (n=8) for both high and low timer values. Using the reference signal of 181 with the recovered PSK signal of 180 as inputs to the phase detector would result in the problem shown in FIG. 15. The signals 182 and 183 in FIG. 16, show the same recovered PSK signal 182, but with a duty cycle adjusted reference signal 183. The duty cycle adjustment is made, by changing the high and low counter values in the reference generator of the timer. Note that the normal 50/50 duty cycle reference generator high and low timer values are 8 counts for the high time and 8 counts for the low time. This totals 16 counts, which determines the frequency of the reference generator signal. In 183, the reference generator high time is reduced by 2 counts, and the low time is increased by 2 counts, to provide the necessary duty cycle adjustment. The overall count (6+10) is still maintained at 16, to keep the frequency the same. The high time is therefore 6/16 or 37.5%, and the low time is 10/16 or 62.5%. By changing the duty cycle of the reference signal to match that of the recovered PSK signal, the delta phase curve will correctly match the desired curve in FIG. 2. The duty cycle of the reference signal can be adjusted, by changing the high and low count values while keeping the total cycle time constant. By making small changes in the reference signal, the error caused by an asymmetrical duty cycle can be detected and the appropriate duty cycle correction made to the reference signal. This will ensure that the phase detector will generate an optimal output signal.

Figure 17:
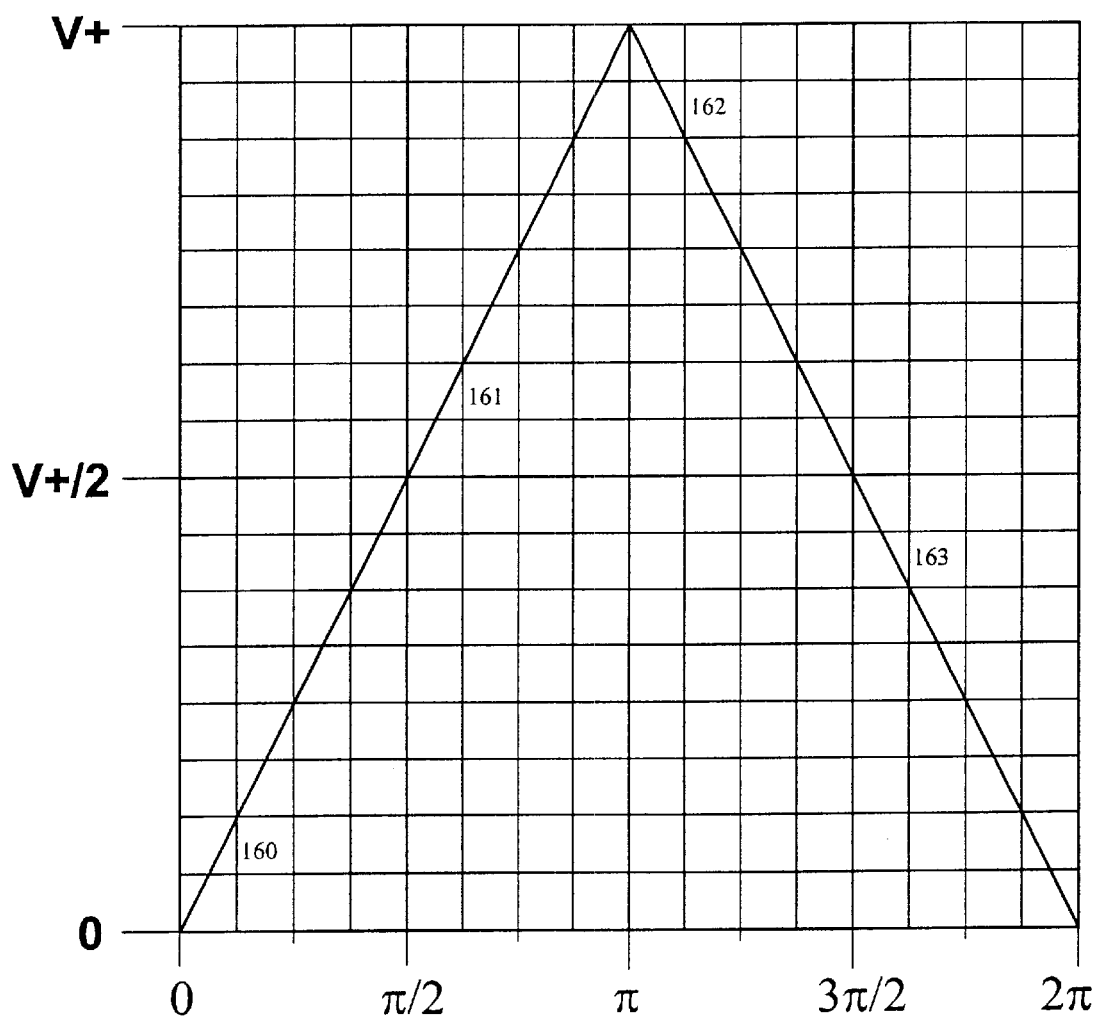
FIG. 17. Plot of filtered phase detector output voltage vs. delta phase in the case of QPSK demodulation.

As stated earlier, the hardware implementation provided for in this invention is not limited to the demodulation of standard PSK or BPSK signals. As evidence of this, two procedures for the demodulation of QPSK will now be described, using the same receiver system hardware. QPSK provides four unique states for a given symbol. This contrasts with two unique states for a standard PSK symbol. Therefore, given a constant symbol rate, the data rate doubles by using QPSK over standard PSK. FIG. 17 shows four points representing the 4 unique states for a given symbol. Assume that during the preamble of the QPSK transmission, the reference signal is adjusted to provide a voltage of V+/8 at the input to the analog to digital converter, represented by 160. Assigning values to the four points in FIG. 17 as desired, say 0 for 160, 1 for 161, 2 for 162 and 3 for 163, it can be seen that by setting threshold levels at V+/4, V+/2 and 3V+/4 a simple method will allow the symbols to be uniquely identified. If the voltage at the input to the analog to digital converter is in the range of 0 to V+/4, the symbol 0 has been detected 160. If the voltage at the input to the analog to digital converter is in the range of V+/4 to V+/2 the symbol 3 has been detected 163. If the voltage at the input to the analog to digital converter is in the range of V+/2 to 3V+/4 the symbol 1 has been detected 161. If the voltage at the input to the analog to digital converter is in the range of 3V+/4 to V+ the symbol 2 has been detected 162. This allows for dynamic movement of the relative phase, while still providing a means to demodulate the QPSK signal. The analog to digital conversion rate remains at the symbol rate. Thus demodulation of QPSK with the method described above requires essentially equivalent system resources as compared to the demodulation of standard PSK signal. This method does however limit the range of the dynamic delta phase when compared to standard PSK demodulation, but can be compensated for by increasing the adjustment rate of the reference signal, or more tightly controlling the frequencies of the transmitter carrier and the reference signal clocks. After a QPSK symbol has been detected, the difference between the actual voltage for the symbol and the optimum voltage for the symbol can be calculated and used for slight adjustments to the phase of the reference signal.

Figure 18:
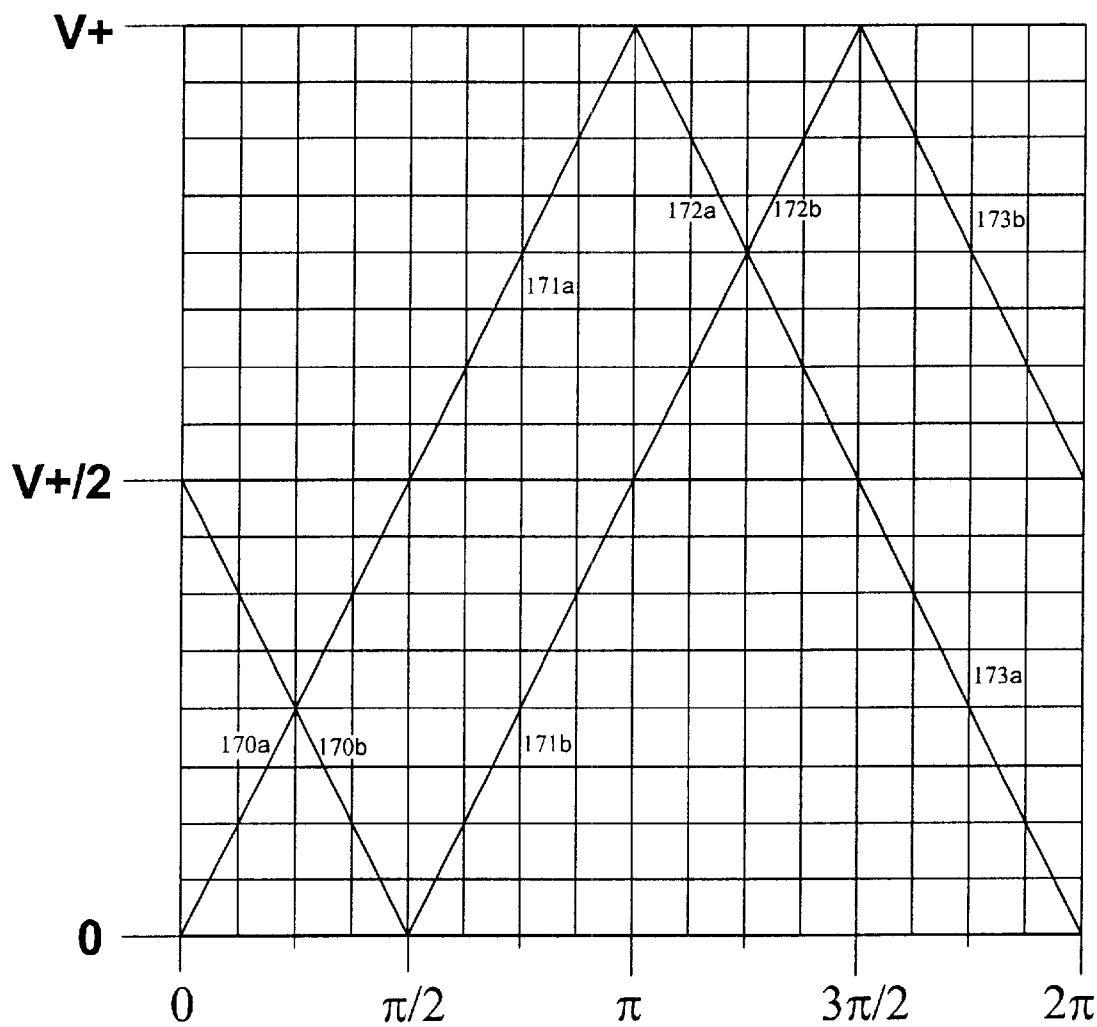
FIG. 18. Plot of filtered phase detector output voltage vs. delta phase in the case of QPSK demodulation with second plot at an offset of $\pi/2$ radians.

A second method for the demodulation of QPSK signals provides for a wider dynamic delta phase range by performing two, analog to digital conversions per symbol. In FIG. 18, a second delta phase plot is added with a π/2 radian offset. The first plot, going through points 170a, 171a, 172a and 173a is in the same position as that of FIG. 2, while the second plot with the π/2 radian offset is defined by points 170b, 171b, 172b and 173b. Assume that during the preamble of the QPSK transmission, the reference signal is adjusted to provide a voltage of V+/4 at the input to the analog to digital converter, represented by 170a. Assigning values to four sets of dual points in FIG. 18 as desired, say 0 for 170a/170b, which is a crossover point, 1 for 171a/171b, 2 for 172a/172b, which is a crossover point, and 3 for 173a/173b, it will be seen that by setting a single threshold level at V+/2, and implementing the method of the invention so that it tests two values for each symbol, the first being an analog to digital conversion with the reference clock set to the initial setting, and the second being an analog to digital conversion with the reference signal offset by π/2 radians, the four QPSK symbols will be uniquely identified. If the voltage at the input to the analog to digital converter is in the range of 0 to V+/2 for both the first and second values 170a/170b, the symbol 0 has been detected. If the voltage at the input to the analog to digital converter is in the range of V+/2 to V+ 171a for the first value and in the range of 0 to V+/2 171b for the second value the symbol 1 has been detected. If the voltage at the input to the analog to digital converter is in the range of V+/2 to V+ for both the first and second values 172a/172b, the symbol 2 has been detected. If the voltage at the input to the analog to digital converter is in the range of 0 to V+/2 for the first value and in the range of V+/2 to V+ for the second value, the symbol 3 has been detected. This allows for dynamic movement of the relative phase that is twice the range of the single sampled QPSK method. The analog to digital conversion rate remains at twice the symbol rate. Thus demodulation of QPSK with the method described above requires essentially equivalent system resources as compared to the demodulation of standard PSK signals with the exception of the double analog to digital conversion. After the QPSK symbol has been detected, the difference between the actual voltage for the symbol and the optimum voltage for the symbol can be calculated and used for slight adjustments to the phase of the reference signal. Even with the requirement for an analog to digital conversion rate at two times the symbol rate, the method described in this invention requires very low bandwidth processing and analog to digital conversion rates when compared to the current art using digital signal processing, which typically requires analog to digital conversion sampling and complex processing at the Nyquist rate of the PSK carrier. As an example, With a 500 KHz PSK carrier frequency and a 9600 bit per second data rate, the QPSK symbol rate would be 4800 symbols per second. This would require an analog to digital conversion rate of 9600 conversions per second. The processor would also be required to execute the low overhead demodulation algorithms 4800 times a second. This can easily be implemented with a microcontroller running at 4 MHz, which has an embedded 8-bit analog to digital converter with a conversion rate of 25 KHz. Conversely, the typical DSP implementation would require an analog to digital conversion bandwidth of over 1 MHz or 40 times that required by this invention, and a typical DSP clock rate of 40 MHz or ten times that required by this invention.

The previous descriptions generally referred to an initial setting of the reference signal, which was based on a reference phase sent by the transmitter during the preamble time of the data transmission stream. This preamble period can be eliminated by use of information provided by the data stream itself. One low level example of this is differential PSK or DPSK. Demodulation of DPSK eliminates the need for an absolute phase reference and the associated preamble time by using relative phase changes. The phase from one symbol to the next symbol encodes the value of the data. For example, if the phase of the current symbol is the same as the phase of the previous sample then the value of the current symbol might be a 0. If the phase from the current symbol relative to the phase of the previous symbol changed, then the value of the current symbol might be a 1. DPSK is fully compatible with the system described in this invention, and all of the advantages of this system apply to the demodulation of DPSK signals as well.

The present invention is therefore a method for efficiently demodulating a PSK modulated signal in a PSK system having a transmitter generating a PSK signal that is crystal based, a receiver, a means for generating a reference signal that is crystal based, a simple phase detector, a simple analog low pass filter and an analog to digital converter coupled with a means for executing the unique demodulation methods by a processor. The method of the present invention enables the system to unambiguously demodulate various types of PSK modulated signals. Implementation of the demodulator circuit allows the partial use of an existing low end microcontroller or other processor with a minimum of external circuitry which significantly reduces the cost of the demodulator, on the order of 10:1 as compared to DSP other digital solutions. Significantly reduces the power consumption due to the low bandwidth requirements of the analog to digital converter and the execution of the method by the processor only at the symbol rate, on the order of 5:1 to 10:1. A reduction in EMI radiation due to the lower clock rates allowed by the processor as compared to a DSP system which requires very high clock rates due to the complex high bandwidth calculations. There is an increase in the system reliability due to the small number of external components and low power consumption of the circuitry. The use of analog circuitry only in the non-critical low pass filter is advantageous over digital systems where the filtering requires high-speed memory intensive DSP methods or such complex digital logic circuits. Analog solutions such as a PLL circuit exhibit problems with their associated unreliability and non-repeatability. The method of the present invention permits the demodulation of a variety of PSK types including BPSK, QPSK and DPSK, and provides the ability to switch from one type to another without any modifications to the circuitry.

What is claimed:

1. In a PSK system having a transmitter for transmitting a PSK signal, and having a preamble period during which time no symbols are transmitted, a method for demodulating PSK modulated signals comprising the steps:

(a) receiving said PSK modulated signal during said preamble period;

(b) generating a reference signal;

(c) detecting the phase difference between said PSK modulated signal and said reference signal and generating a first voltage level corresponding to said phase difference;

(d) detecting the phase difference between said PSK modulated signal and said reference signal a second time after a predetermined phase delay and generating a second voltage level corresponding to said phase difference; and (e) adjusting the phase of the reference signal corresponding to the difference between said voltage levels to one of maximize and minimize the phase difference between the phase of the reference signals and the phase of the PSK modulated signal.

2. The method of claim 1, wherein said phase delay is $\pi/2$ radians.

3. The method of claim 1, wherein said phase delay is $\pi/4$ radians.

4. The method of claim 1, including repeating steps (a), (b), (c), (d), and (e) at predetermined intervals.

5. In a PSK system having a transmitter for transmitting a PSK signal, and having a preamble period during which time no symbols are transmitted, and having a symbol transmitting period, a method for demodulating PSK modulated signals comprising the steps:

(a) receiving said PSK modulated signal during said preamble period;

(b) generating a reference signal;

(c) detecting the phase difference between said PSK modulated signal and said reference signal and generating a first voltage level corresponding to said phase difference;

(d) detecting the phase difference between said PSK modulated signal and said reference signal a second time after a predetermined phase delay and generating a second voltage level corresponding to said phase difference;

(e) adjusting the phase of the reference signal corresponding to the difference between said voltage levels to one of maximize and minimize the phase difference between the phase of the reference signals and the phase of the PSK modulated signal;

(f) receiving said PSK modulated signal during said symbol transmitting period; and (g) detecting the phase difference between said PSK signal received during said symbol transmitting period and said reference signal.

6. The method of claim 5, wherein said phase delay is $\pi/2$ radians.

7. In a PSK system having a transmitter for transmitting a PSK signal, and having a preamble period during which time no symbols are transmitted, and having a symbol transmitting period, a method for demodulating PSK modulated signals comprising the steps:

(a) receiving said PSK modulated signal during said preamble period;

(b) generating a reference signal;

(c) detecting the phase difference between said PSK modulated signal and said reference signal and generating a first voltage level corresponding to said phase difference;

(d) detecting the phase difference between said PSK modulated signal and said reference signal a second time after a predetermined phase delay and generating a second voltage level corresponding to said phase difference;

(e) adjusting the phase of the reference signal corresponding to the difference between said voltage levels to one of maximize and minimize the phase difference between the phase of the reference signals and the phase of the PSK modulated signal;

(f) receiving said PSK modulated signal during said symbol transmitting period;

(g) detecting the phase difference between said PSK signal received during said symbol transmitting period and said reference signal; and (h) repeating steps (f) and (g) at predetermined intervals.

8. In a PSK system having a transmitter for transmitting a PSK signal, and having a preamble period during which time no symbols are transmitted and a symbol transmitting period during which time symbols are transmitted at a symbol rate, a method for demodulating PSK modulated signals comprising the steps:

(a) receiving said PSK modulated signal during said preamble period;

(b) generating a reference signal;

(c) detecting the phase difference between said PSK modulated signal and said reference signal at a rate corresponding to the symbol rate and generating a first voltage level corresponding to said phase difference;

(d) detecting the phase difference between said PSK modulated signal and said reference signal at a rate corresponding to the symbol rate a second time after a predetermined phase delay and generating a second voltage level corresponding to said phase difference; and (e) adjusting the phase of the reference signal corresponding to the difference between said voltage levels to one of maximize and minimize the phase difference between the phase of the reference signals and the phase of the PSK modulated signal.

9. The method of claim 8 including the steps of:

(a) receiving said PSK modulated signal during said symbol transmitting period; and (b) detecting the phase difference between said PSK signal received during said symbol transmitting period and said reference signal.

10. The method of claim 8 wherein said phase delay is $\pi/2$ radians.

11. In a PSK system having a transmitter for transmitting a PSK signal, and having a preamble period during which time no symbols are transmitted, a method for demodulating PSK modulated signals comprising the steps:

(a) receiving said PSK modulated signal during said preamble period;

(b) generating a reference signal;

(c) detecting the phase difference between said PSK modulated signal and said reference signal and generating a first voltage level corresponding to said phase difference;

(d) detecting the phase difference between said PSK modulated signal and said reference signal a second time after a predetermined phase delay and generating a second voltage level corresponding to said phase difference; and (e) adjusting the phase of the reference signal corresponding to the difference between said voltage levels to maximize the difference between said voltage levels.

12. The method of claim 11 wherein said phase delay is $\pi/2$ radians.

13. The method of claim 11 including repeating steps (a), (b), (c), (d) and (e).

14. In a PSK system having a transmitter for transmitting a PSK signal, and having a preamble period during which time no symbols are transmitted and a symbol transmitting period during which time symbols are transmitted at a symbol rate, a method for demodulating PSK modulated signals comprising the steps:

(a) receiving said PSK modulated signal during said preamble period;

(b) generating a reference signal;

(c) detecting the phase difference between said PSK modulated signal and said reference signal at a rate corresponding to the symbol rate and generating a first voltage level corresponding to said phase difference;

(d) detecting the phase difference between said PSK modulated signal and said reference signal at a rate corresponding to the symbol rate a second time after a predetermined phase delay and generating a second voltage level corresponding to said phase difference; and (e) adjusting the phase of the reference signal corresponding to the difference between said voltage levels to maximize the difference between said voltage levels.

15. The method of claim 14 wherein said phase delay is $\pi/2$ radians.

16. The method of claim 14 including repeating steps (a) through (e) at predetermined intervals.

17. In a PSK system having a transmitter for transmitting a PSK signal, a method for demodulating PSK modulated signals comprising the steps:

(a) receiving said PSK modulated signal;

(b) generating a reference signal;

(c) detecting the phase difference between said PSK modulated signal and said reference signal and generating a first voltage level corresponding to said phase difference;

(d) detecting the phase difference between said PSK modulated signal and said reference signal a second time after a predetermined phase delay and generating a second voltage level corresponding to said phase difference; and (e) adjusting the phase of the reference signal corresponding to the difference between said voltage levels to one of maximize and minimize the phase difference between the phase of the reference signals and the phase of the PSK modulated signal.

18. The method of claim 17, wherein said phase delay is $\pi/2$ radians.

19. The method of claim 17, wherein said phase delay is $\pi/4$ radians.

20. The method of claim 17, including repeating steps (a), (b), (c), (d), and (e) at predetermined intervals.

* * * * *